(12) United States Patent
Chabaud

(10) Patent No.: US 12,156,550 B2
(45) Date of Patent: Dec. 3, 2024

(54) 3D CUSTOM-FIT BRASSIERE

(71) Applicant: ENDEER, Nanterre (FR)

(72) Inventor: Claire Chabaud, Nice (FR)

( * ) Notice: Subject to any disclaimer, the term of this patent is extended or adjusted under 35 U.S.C. 154(b) by 439 days.

(21) Appl. No.: 17/251,013

(22) PCT Filed: Jun. 13, 2019

(86) PCT No.: PCT/FR2019/051424
§ 371 (c)(1),
(2) Date: Dec. 10, 2020

(87) PCT Pub. No.: WO2019/239068
PCT Pub. Date: Dec. 19, 2019

(65) Prior Publication Data
US 2021/0212389 A1   Jul. 15, 2021

(30) Foreign Application Priority Data

Jun. 13, 2018 (FR) ....................................... 1855174

(51) Int. Cl.
*A41C 3/12*   (2006.01)
*A41C 3/00*   (2006.01)

(52) U.S. Cl.
CPC .......... *A41C 3/0028* (2013.01); *A41C 3/0007* (2013.01); *A41C 3/122* (2013.01)

(58) Field of Classification Search
CPC ...... A41C 3/0028; A41C 3/0007; A41C 3/122
USPC ..................................................... 450/41, 58
See application file for complete search history.

(56) References Cited

U.S. PATENT DOCUMENTS

| | | | | |
|---|---|---|---|---|
| 2,706,816 A * | 4/1955 | Dozier | ................ | A41C 3/0028 2/104 |
| 3,826,266 A * | 7/1974 | Alpert | ................ | A41C 3/0071 450/11 |
| 4,441,269 A * | 4/1984 | Dahl | ................ | G09F 1/12 40/564 |
| 6,575,811 B1 | 6/2003 | Fildan et al. | | |
| 7,118,444 B2 * | 10/2006 | Newman | ............. | A41C 3/0092 450/54 |

(Continued)

FOREIGN PATENT DOCUMENTS

WO   2009/137223 A2   11/2009

OTHER PUBLICATIONS

Motard Geek, "Joyfit, Le Service D'Impression 3D De Soutiens-Gorge Sur-Mesure", Sep. 1, 2014, pp. 1-2.

(Continued)

*Primary Examiner* — Gloria M Hale
(74) *Attorney, Agent, or Firm* — Claire Chabaud

(57) ABSTRACT

The invention relates to a brassiere 40 customized for a user comprising two cups 41, 42 for each receiving a breast of the user, each cup 41, 42 being made of an elastic material, characterized in that each cup 41 42 is detachable and in that the brassiere comprises for each cup 41, 42 an element 26 for fitting the cup to the shape of the breast in the form of a 3D curved rod 20 produced according to the measurements of the user said that 3D curved rod being designed to contour the entire length of the shape of the inflammatory fold of the user, and extending from the vicinity of the sternum of the user to the vicinity of the armpit of the user such that said 3D curved rod 20 stretches the cup 41, 42 in such a way that it molds the shape of the breast.

7 Claims, 2 Drawing Sheets

(56) References Cited

U.S. PATENT DOCUMENTS

| | | | |
|---|---|---|---|
| 7,232,359 B1* | 6/2007 | Richardson | A41C 3/0028 450/86 |
| 7,425,170 B1 | 9/2008 | Herbert et al. | |
| 7,695,343 B2* | 4/2010 | Nobbs | A41C 3/02 450/60 |
| 7,922,560 B2* | 4/2011 | Avalos-Dessner | A41C 3/144 450/39 |
| 2005/0112996 A1* | 5/2005 | Buehler | A41F 1/006 450/58 |
| 2006/0003669 A1* | 1/2006 | Li | A41F 1/006 450/58 |
| 2006/0228988 A1* | 10/2006 | Weyenberg | A41C 3/02 450/58 |
| 2009/0075532 A1* | 3/2009 | Oishi | B63H 20/007 440/1 |
| 2009/0075562 A1* | 3/2009 | Lung | A41C 3/12 450/86 |
| 2016/0021938 A1 | 1/2016 | Carpenter | |
| 2017/0340023 A1 | 11/2017 | McKeen et al. | |

OTHER PUBLICATIONS

International Search Report for PCT/FR2019/051424 dated Sep. 18, 2019 [PCT/ISA/210].
Written Opinion for PCT/FR2019/051424 dated Sep. 18, 2019 [PCT/ISA/237].

* cited by examiner

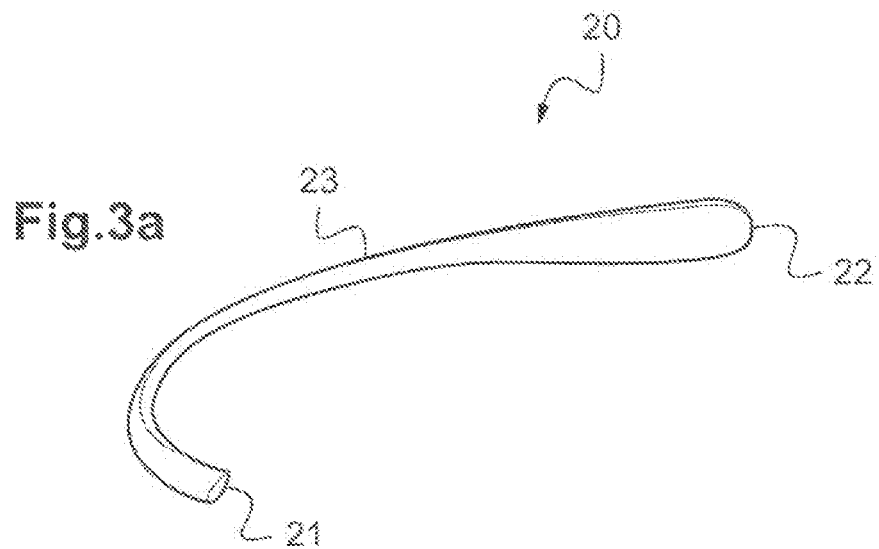
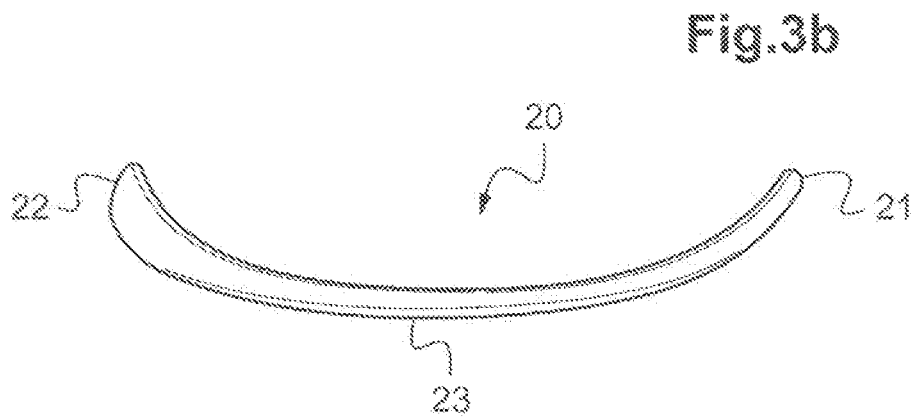

3D CUSTOM-FIT BRASSIERE

CROSS REFERENCE TO RELATED APPLICATIONS

This application is a National Stage of International Application No. PCT/FR2019/051424 filed Jun. 13, 2019, claiming priority based on French Patent Application No. 1855174 filed Jun. 13, 2018, the entire contents of which are incorporated by reference herein.

The present invention relates to a customized brassiere which respects the individual anatomy and maintains the health of the breasts of a user.

A brassiere is an undergarment which generally consists of a textile body comprising two cups that each hold one breast, underwiring and reinforcements for holding and shaping the breast in the cup and straps for fixing the brassiere to the bust of the user.

A user selects a brassiere, aside from its aesthetic appearance, on the basis of two main morphological parameters: their chest size and the depth of the cup. However, many women wear brassieres that are badly fitted to their shape, on the one hand because standard sizes of brassieres are not suitable for them and on the other hand because the bust of a women changes over time. In addition to the discomfort, the stress exerted by the metal wires on the breasts affects good lymph circulation.

However, it is known that a badly fitting brassiere can have a detrimental effect on the health of the person wearing it, such as musculoskeletal problems or problems with lymph drainage.

One solution for users is thus to purchase made-to-measure brassieres, which are also referred to as customized brassieres. However, due to the complexity of manufacturing a made-to-measure brassiere, generally made by assembling reinforcements, underwiring and pads integrated into a textile body by hand, they take a relatively long time to make and are expensive. Moreover, until now there has not been a solution that provides underwiring which takes into account the health of the breast. The underwiring needs to follow the emergence of the breast and the ribs in order to distribute the weight more effectively without putting pressure on the breast and blocking lymph circulation.

The aim of the invention is therefore to propose a modular brassiere with a back independent of the left cup, which itself is independent of the right cup, and with two single and independent underwires. Each cup is shaped by a made-to-measure underwire of the brassiere which is relatively simple and inexpensive to produce, in order to provide brassieres which are fitted and customized to the bust of the user without constricting the lymph circulation.

A customized brassiere is proposed for a user, comprising two independent cups for each receiving a breast of the user, each cup being made of an elastic material.

Each cup is detachable and for each cup the brassiere comprises an element for fitting the cup to the shape of the breast, in the form of a curved rod produced according to the measurements of the user, said curved rod being designed to contour the entire length of the shape of the inframammary fold up to the ribs of said user, and extending from the vicinity of the sternum of the user to vicinity of the axillary hollow of the user, such that said curved rod stretches the cup to fit the shape of the breast up to the ribs; said element for fitting the cup to the shape of the breast has a substantially flat form and is widened at its axillary end in the vicinity of the axillary hollow, substantially in the form of a spatula, to fit flat against the ribs of the user in the direction of the axillary hollow.

It is thus possible to obtain a customized brassiere adapted to the shape of the user, ensuring optimal support, improved comfort and ensuring in particular better lymph drainage of the mammary area.

In particular, the curved rod has a shape which ensures the good positioning of the cup around the breast without hurting the user when it rests against the torso and the ribs, while making it possible to avoid affecting the lymphatic areas.

As each cup is detachable, it is possible to select each cup and back independently to form a customized, which in particular makes it possible to customize the brassiere taking into account the asymmetry of a per son's breasts. Indeed, it is known that about 85% of women have mammary asymmetry. The separation of the two cups, by being detachable from one another and from the rest of the brassiere, thus makes it possible to ensure an optimal choice of cup for each breast of the user.

Furthermore, the fact that the described cups are detachable makes it possible to reduce the number of sizes produced on the manufacture of brassieres. Indeed, in the prior art it is known that there are standard chest sizes from 70 to 130, with increments of 5, and cup sizes from A to K. For each cup, it is thus necessary in theory to produce enough models for each available chest size so as to obtain a brassiere of the correct size for each potential user. However, this makes production extremely expensive, taking into account the number of different models to be produced and stocked. Because of this, few brands can cover all bust sizes due to the number of sale units required.

The brassiere according to the invention thus makes it possible, by having detachable and customized cups, backs and made-to-measure underwiring, to reduce the number of models produced. Indeed, it is possible to pro duce a plurality of sizes of detachable cups and backs, which are selected and put together as brassieres in a customized manner, for example taking into account the straps and back fastenings adapted to the bust size. One back size can be used for all cups, and likewise for the cups between one another, which makes it possible to cover all possible sizes, or 143 sizes with only 35 sale units, which divides the amount of stocked required by 4.

Furthermore, the definition of the cup is no longer necessarily carried out according to a choice based on standard criteria such as the cup size where the user thinks they know the size suitable for their bust, but on other criteria such as measurements taken directly from the user, by photographing the breast, taking a 3D scan of the breast or any other appropriate technique.

The brassieres according to the invention can thus be obtained without necessarily referring to a standard size such as the bust-cup size but to the shape and/or volume of the breast.

The element for fitting the cup to the form of the breast, in this embodiment in the form of a curved rod, also makes it possible to improve the customization by limiting the detachable and elastic cup, which has already been selected in a size suitable for the corresponding breast of the user, so that this cup takes on the form of the user's breast without constricting the breast to a non-natural form.

Indeed, the curved rod according to the invention differs from the underwires of the prior art, in that they are tailor-made and their form as described makes it possible to force the cup to take on the natural form of the breast, whereas underwiring from the prior art constricts the breast to the form of the cup.

Furthermore, the curved rod according to the invention is a three-dimensionally curved rod, also referred to as a 3D curve, and is not limited to curvature in a bidimensional plane, in order to match the contour of the inframammary fold on contact with the thoracic wall of the user, and to lie in turn against the ribs of the user up to below the axillary hollow. The latter differs from underwiring of the prior art which is generally curved in a bidimensional plane, which can also be referred to as a 2D curvature, in the form of an arch placed underneath the breast.

In particular, the curved rod extends at its axillary end below the axillary hollow of the user. In other words, the curved rod at its axillary end moves round to the thoracic wall, bearing against a lateral part of the ribcage of the user, below the axillary hollow, also referred to as the armpit.

In particular, the curved rod has a direction of extension at its axillary end which is oriented towards the axillary hollow, the curved rod resting at this axillary end against a lateral part of the ribcage of the user.

Advantageously and in a non-limiting manner, each cup has a sleeve in its lower edge for receiving said associated curved rod. Thus the curved rod can be inserted in a simple and reliable manner into the associated cup. Furthermore, the sleeve of the cup and the associated curved rod make it possible to obtain brassieres of various textile designs at the same time as ensuring optimal comfort.

Advantageously and in a non-limiting manner, said sleeve is made from a hemline along the entire length of the lower edge of said cup, having at least one lateral opening for inserting or removing said curved rod, and in that it comprises an elastic sheath in said hemline to ensure a secure hold of the curved rod in the cup. Thus, the sleeve can be made in a relatively simple manner from the same material as the cup, and can be in one piece with the cup, which means lower manufacturing costs, and ensures a relatively secure hold of the curved rod in the cup.

Advantageously and in a non-limiting manner, each cup has a lateral axillary portion which is designed to rest against the ribs of the user below the axillary hollow. Thus, the cup has an optimized shape for permitting support, lymphatic drainage and improved comfort for the user In particular, the cup passes around to a lateral part of the thoracic cage of the user substantially below the axillary hollow.

Advantageously and in a non-limiting manner, the brassiere comprises adjustable detachable straps. This makes it possible to customise the brassiere, also taking into account in particular the size of the bust and the shape of the user.

Advantageously and in a non-limiting manner, the brassiere comprises a back-support device, comprising two lateral bands, each joined to a cup, each connected to the lower edge of said cup, substantially in the vicinity of the lateral axillary end of said cup, and a detachable back band, designed to be fixed in a detachable manner to two lateral fixing bands, at their respective free ends. Thus it is possible to customise the brassiere taking into account the bust measurement of the user.

Thus, a user can reuse a brassiere, after a period of putting on weight or losing weight, with a preserved cup, simply by changing the back-support band and/or the detachable straps.

Advantageously and in a non-limiting manner, said detachable back band is made from an elastic material, which makes it possible to ensure increased comfort and a better adjustment of the brassiere to fluctuations in the bust size of a user.

The invention also relates to a method for obtaining a brassiere as described above comprising:
  a step of obtaining a photograph of each breast of a user, for example by taking a photo from a personal computer, a smartphone or a tablet, or by 3D scanning or any other known imaging technique.

According to one particular implementation, the step of obtaining the method can comprise any other means of obtaining information which makes it possible to characterize the breasts of the user, for example by acquiring information provided directly by the user, for example in response to a precise questionnaire on the form of their breasts which makes it possible to propose a match with a form of semi-measured underwiring:
  a step of acquiring morphological information about the user such as their size and weight, for example by processing the image of the photographs obtained or by taking information directly from the user;
  a step of processing the image of each breast, so as to define representative parameters of the volume, form and curvature of each breast, as well as the definition of the three-dimensional curve of the inframammary fold;
  for each breast, a step of selecting a cup which is adjusted according to the morphological information and the photographs obtained;
  for each breast, a step of defining an element for fitting the cup associated with the form of the corresponding breast according to the morphological information and photographs taken, comprising the definition of the three-dimensional curve of the curved rod and the lateral axillary widening of said curved rod; and
  a step of determining straps and an adjusted back band.

The invention also relates to a method for manufacturing a fitting element as described above comprising:
  a step of receiving information defining said fitting element comprising information on the three-dimensional curvature of the curved rod, for example parametric information; and
  a step of 3D printing said curved rod or any other customized method or standard method of industrial production. Other features and advantages of the invention are given in the following description of a particular embodiment of the invention, given by way of a non-limiting example with reference to the accompanying drawings in which:

BRIEF DESCRIPTION OF THE DRAWINGS

FIG. 3a is a view of an element for fitting the cup to the form of the breast of a user of the brassiere according to the embodiment of FIG. 1; and FIG. 3b is another view of an element for fitting the cup of the brassiere according to the embodiment of FIG. 1.

DETAILED DESCRIPTION OF THE DRAWINGS

Figure 1:
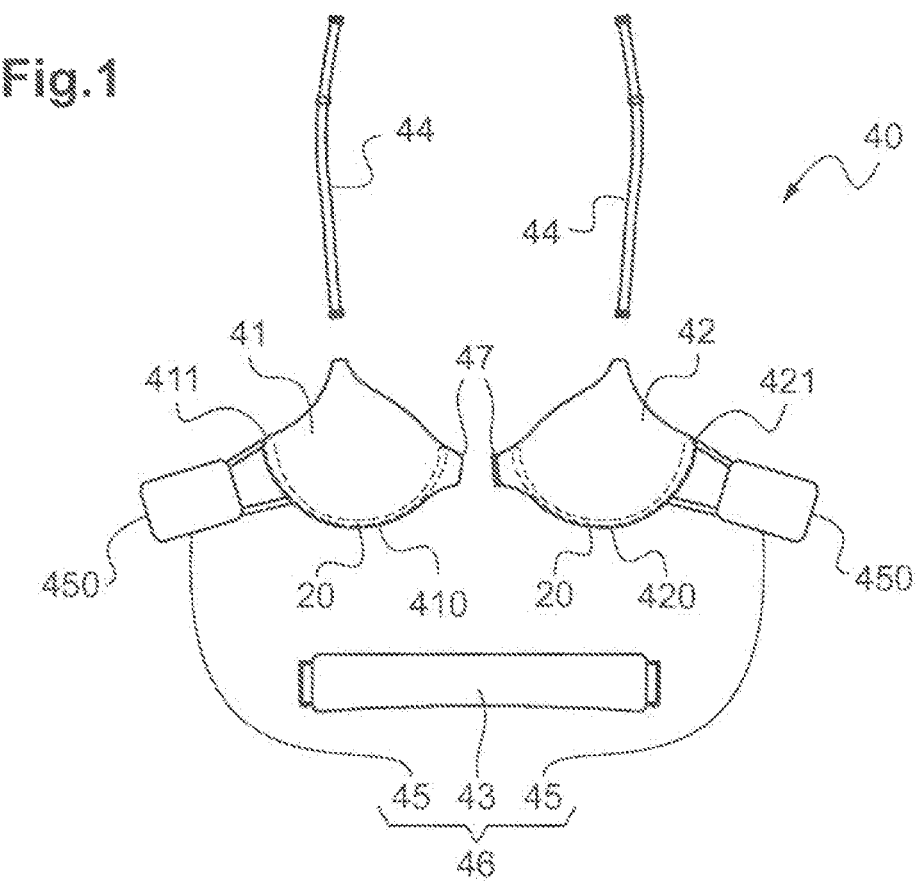
FIG. 1 is an exploded view of a brassiere according to an embodiment of the invention.
Figure 2:
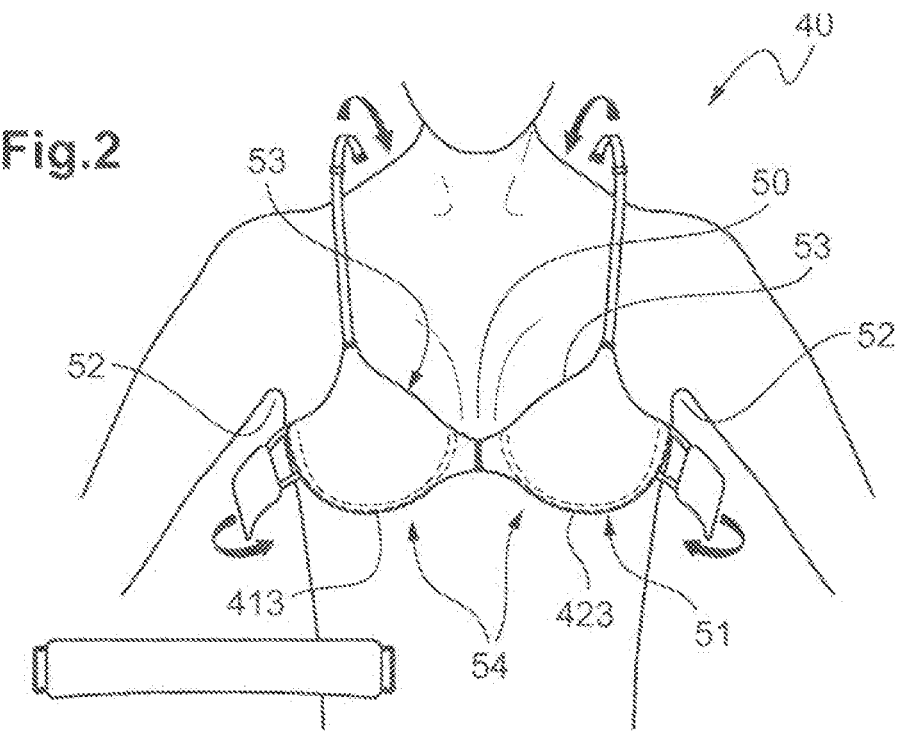
FIG. 2 is another view of the brassiere according to the embodiment of FIG. 1 with the cups positioned on the torso of a user.

FIGS. 1, 2, 3a and 3b relate to the same embodiment and will be discussed simultaneously.

In this embodiment, a customized brassiere 40 comprises two cups 41, 42, adjustable straps 44 and a back-support device 46 for holding the brassiere 40 against the bust of the user.

However, the invention is not limited to a brassiere with straps and also relates to a strapless brassiere with or without a back band.

The cups 41, 42 are connected to one another by a detachable fastening 47 substantially in the vicinity of the sternum 50 of a user wearing the brassiere 40. Each cup 41, 42 can have a different size and a different shape from the other cup 41, 42, so as to adapt to a users asymmetrical breasts.

The removable fastening 47 in this embodiment is a clip fastening relatively common for brassieres. However, the invention is not limited to this type of fastening and any fastening means known to a person skilled in the art can be used, a snap button, a standard button or another other type of closure. In particular, the type of fastening can be selected according to criteria for fastening closure, comfort and also according to aesthetic and/or discretionary criteria.

The detachable sternal fastening 47 of the two cups 41, 42 in this embodiment is the only element to be manipulated for fitting the brassiere to the users chest. In other words, the brassiere according to this embodiment is designed to be fastened by the user at the level of their sternum, by the detachable fastening 47 between the cups.

The other detachable parts of the brassiere are designed to permit customization and an increased adjustment of the brassiere.

However, the invention is not limited to this single way of fastening the brassiere to the users bust, and it is possible in particular to fasten the brassiere at the opening of the back-support device 46 described in the following.

The back-support device 46, comprises two lateral bands 45, each joined to a cup 41, 42, and each connected to the lower edge 410, 420 of said corresponding cup 41, 42, substantially in the vicinity of the lateral axillary end 411, 421 of the corresponding cup 41, 42, and a detachable back band 43, adjusted to be fixed in a detachable manner to two lateral fastening bands 45 at their respective free ends 450.

The back band 43 is selected according to the shape of the user so as to enable an optimal adjustment of the brassiere on the user.

Here the back band 43 is made of an elastic material, for example the same material as the cups 41, 42, in order to improve the comfort of wearing the brassiere for the user.

The lateral bands 45 joined to each cup 41, 42 are of standard length, for example extending in the direction of the users back between 5 cm and 20 cm. The adjustment of the brassiere 40 to the shape of the user, in particular with regard to their bust measurement, is performed by selecting a back band 43 with a length and thickness which is adapted to permit optimum support and is not compressive but fits firmly against the users back.

The lateral bands 45 can be made from an assembly of stitched pieces or pieces fused to one another in order to give an aesthetic appearance and optimized comfort, for example comprising a transparent insert.

The detachable straps 44, are each fixed in a detachable manner to a corresponding cup 41, 42, to an upper part of the corresponding cup 41, 42, referred to as the upper cup 53, substantially opposite the lower part of the cup 41, 42, referred to as the lower cup 54.

Furthermore, the straps 44 are also fixed in a detachable manner to the back-fastening band 43.

The straps 44 in this embodiment are high strength, with reliable elasticity. The length adjustment of the straps 44 is performed according the usual practice of the prior art, namely an adjusting ring which can slide along the whole length of the strap 44.

Thus the straps 44 extend between the upper cup of the brassiere and the back of the user, both passing over the users shoulder, so as to ensure a substantially vertical support of the brassiere, in the invention the vertical reference being the height of the user in a standing position. Thus the straps can be selected taking into account the height of the bust of the user, in particular the distance between the shoulders and the sternum of the user.

The straps 44 can be fixed in a detachable manner to the back band 43, after crossing or not crossing the back of the user.

When designing a customized brassiere 40 for a user it is possible to select on the one hand two appropriate cups 41, 42 that are designed in more detail below, a back band 43 for optimising the back support, and two detachable straps 44 for improving the vertical hold of the brassiere 40, in particular taking into account the height of the bust of the user and their shape.

The fastening of the straps 44 to the cups 41, 42 and of the back band 43 to the associated lateral bands 45 can be performed by detachable fastening means described above for fastening the two cups 41, 42 together.

Each cup 41, 42 is made of an elastic material, for example a bidynamic material (referred to as bi-stretch material), in particular elastane or any other suitable material.

For example, the elasticity of the material forming each cup 41, 42 may be between 15% and 35%, for example an elasticity of 20%.

Each cup 41, 42 is designed to receive a breast of the user wearing the brassiere 40.

In order to improve the fitting of each breast of the user into its associated cup, the brassiere 40 comprises for each cup 41, 42 an element for fitting 20 the cup 41, 42 to the contour of the breast.

The element for fitting 20 the cup 41, 42 to the form of the breast comprises a curved rod 20 made of plastic material.

This curved rod 20 is made to fit around the inframammary fold of a user up to their ribs. The curved rod 20 differs from a standard underwire of a brassiere of the prior art, also known as a whale bone, in that it does not restrict the breast in any particular position. On the contrary, the curved rod 20 fits around the contour of the emergence of the breast between the sternum 50 of the user and the axillary hollow 52 of the user, by following between these two ends the emergence of the breast against the lower thoracic wall, referred to as the inframammary fold 51.

Thus the curved rod 20, extending between a sternal end 21 and an axillary end 22, can be positioned below the breast without the latter being deformed by said curved rod 20.

This curved rod 20 has a substantially flat straight section so as to be able to be placed flat against the thorax and the ribs of the user.

The curvature of the curved rod 20 is a three-dimensional curvature, and not a curvature in a bidimensional plane, such as those generally used in the underwiring of the prior art.

This three-dimensional curvature makes it possible in particular for the curved rod 20 to rest flat at its axillary end against the lateral part of the thoracic cage of the user, below the axillary hollow, also referred to as an armpit.

In order to ensure optimal cooperation between the cup and the curved rod 20, and consequently optimum comfort for the user, each cup 41, 42 has a lateral axillary extension of material which enables the cup to pass round against the ribs of the user to below the axillary hollow 52.

It is understood from the wording "round against the ribs", "against the ribs" and "up to the ribs" that the cup, or the curved rod, rests on a lateral part of the thoracic case of the user, extending substantially perpendicular to the sternum.

In other words, the cup 41, 42, made of a flexible and elastic material, covers the breast of the user between the sternum 50 and the axillary hollow 52, following below the constraint of the curved rod 20 the inframammary groove 51 of the user and coming around against the ribs of the user below the axillary hollow 52.

At its axillary end 22, the curved rod 20 has a widened portion, forming a spatula, for resting in a pain-free manner against the user's ribs.

The sternal end 21 of the curved rod 20 can also have a widened end relative to the width of the main portion 23 of the curved rod 20. However, for essentially aesthetic reasons and for discretion, there is optimally a slight thickening at the sternal end 21, at the same time still ensuring that this end lies flat against the sternum of the user.

Each curved rod 20 is installed in a removable manner in a corresponding cup 41, 42. This makes it possible to remove the curved rods 20 from the brassiere 40 for example before washing, to avoid damage to the materials used such a lace. Furthermore, the ability to remove the curved rods 20 makes it possible to use them in different brassieres. Thus, it is possible to obtain a single pair of customized curved rods 20 and to use them for a plurality of compatible cups 41, 42.

To enable a simple and robust installation of the curved rod 20 in the corresponding cup 41, 42, the cup comprises on its lower part, referred to as the lower cup 410, 420, a sleeve 413, 423 formed in this embodiment by a hemline or a fold of material of the cup 41, 42 stitched onto itself.

However, the invention is not limited to the formation of a hemline on the lower cup to form the sleeve 413, 423. In particular, it is possible to stitch, adhere or join by any known method a sleeve 413, 423 for accommodating the curved rod 20 in the lower cup 410, 420.

The sleeve 413, 423 is made from a bidynamic material, such as that of the corresponding cup 41, 42, and comprises in this embodiment an elastic lining, also referred to as an elastic sheath, extending over the entire length or over part of the length of the sleeve 413, 423 to increase the friction and thus the support effect of the curved rod 20 when it is inserted into the sleeve 413, 423.

The sleeve 413, 423 has at least one opening for enabling the insertion and the removal of the curved rod 20. In this embodiment the opening is formed at the axillary end of the cup 41, 42. However, it is possible to have an opening at the sternal end of the cup 41, 42 or to have an opening at each end of the lower edge of the cup 41, 42.

To ensure that the curved rod 20 is inserted into the sleeve 413, 423 correctly by the user, a coding means is provided, here an engraving on the curved rod 20, which makes it possible to determine the direction of insertion of the curved rod 20 into the associated sleeve 413, 423.

This engraving makes it possible for the user to know which breast the curved rod 20 corresponds to, for example an engraving indicating left and right, or any other recognisable marking. Furthermore, the engraving can be formed on only one surface of the curved rod 20 such that the user is able to determine how to insert the rod into the sleeve relative to the engraved surface; for example the engraved surface may need to be applied against the users thorax.

Each curved rod 20 is made from a smooth material, such that the insertion into and removal from the sleeve 413, 423 is relatively simple.

The invention also relates to the method of obtaining such a brassiere 40.

The method of obtaining a brassiere 40 comprises a step of obtaining a photograph of each breast of a user. This step is performed in this embodiment by the users themselves. For this purpose a computer program is installed on a computer platform of the user, for example a personal computer or preferably a smartphone or a tablet.

However, this step is not limited to obtaining photographs from the users themselves, and can comprise a step of acquiring morphological information on the user by 3D scanning or any other known solution from the prior art.

The computer programme is then suitable for processing the photographs and performing the following processing steps of the device or transmitting the photographs to a remote secure server for processing the photos and performing the following processing steps of the device.

The method then uses a step of acquiring morphological information on the user such as their size and its weight. This step can be performed either by processing the photographic images obtained from the user, or according to alternatives by processing 3D scanning information and any other known imaging technology, or by taking this information directly from the user.

Then a step is carried out of processing the image of each breast, so as to define representative parameters of the volume, the shape and the curvature of each breast, as well as the definition of the three-dimensional curvature of the inframammary fold. The defined information is not limited to the information indicated and can include other information for refining the customization of the brassiere.

Then a step is carried out of selecting a cup which is adjusted to the morphological information and photographs obtained. Thus this step makes it possible to define the optimal cup for the user without taking into account typical information on cup sizes known from the prior art.

Then a step is performed of defining a fitting element for each associated cup according to the morphological information and photographs taken, comprising the definition of the three-dimensional curve of the curved rod and the lateral axillary widening of said curved rod. This step makes it possible to define a curved rod on the basis of morphological information on the user, so that it matches the form of the submammary fold, which makes it possible to adapt the selected cup, made of an elastic material, to the shape of the breast. This differs from the prior art in which an opposite approach is applied, in which the underwiring restricts the breast to the shape of the cup.

Lastly, the method implements a step of determining the straps and a suitable back band, taking into account the morphological information on the user to enable the adjustment and optimal support of the brassiere and thus optimal comfort.

The invention also relates to a method for producing an element 20 for fitting a brassiere cup to the form of a breast, here a curved rod 20 comprising a step of receiving information defining said fitting element 20 comprising information on the three-dimensional curve of the curved rod, in this embodiment parametric information followed by a step of 3D printing said curved rod 20.

3D printing can be performed by one of the following techniques including:
- additive manufacture by depositing filaments (FDM);
- selective powder sintering (SLS);
- curing of a resin by UV laser (SLA)
- curing of a resin by UV image (CLIP);
- lamination by addition of laser-cut layers (LOM);
- curing a resin by photopolymerisation (DLP); or also
- a binding agent projection technique.

It is possible for the flexible rod 20 to be made from a polyamide material, from silicone, thermoplastic polyurethanes (TPU), acrylonitrile butadiene styrene (ABS) or any other suitable material.

The invention thus enables the users of the brassiere to obtain a customized brassiere, with optimal comfort and optimal support, by the assembly of its detachable parts, straps 44, back band 43, independent cups 41, 42. Furthermore, the brassiere 40 according to the invention ensures the support of lymphatic drainage and a natural breast form by using the curved rod 20 according to the invention.

Furthermore, for the manufacturer, this solution makes it possible to break free from the constraints of production associated with the multiplicity of sizes of brassieres, the sizes comprising the combination of the chest and bust measurements. This enables more economical production, better stock management, and a better range adapted to the expectations of users by reducing the number of cups sizes the cups can be made to fit by the fitting element 20.

The invention claimed is:

1. A customized brassiere for maintaining the health of a user's breasts comprising: two cups, each cup for receiving a breast of the user and formed of an elastic material; the brassiere formed of detachable cups, shoulder straps, and a back support strap; each cup having an upper edge, a lower edge, and a side axillary edge; each cup including a custom cup fitting element in the cup lower edge within a lower edge sleeve to hold the cup fitting element therein and to allow the fitting element to keep the specific cup shape that is formed to fit a volume equal to the user's breasts; each of said cup fitting elements comprises a curved rod that is customized to fit the form of the user's breast by being formed to coincide with measurements of the shape of the user's inframammary fold; the curved rod has a length and contour along said rod's entire length to conform to the shape of the user's inframammary fold up to the ribs of said user; and extending from a vicinity of the user's sternum to the area of the user's axillary hollow; said curved rod thereby stretches the brassiere cup from the tower edge sleeve to thereby match the shape of the user's breast; the fitting rod element is constructed for fitting the cup to the breast of the user having a substantially flat form and being wider at its axillary end in the area of the axillary hollow and in the form of a spatula for resting flat against a user's ribs in the direction of the axillary hollow so as to improve the weight distribution of the user's breast and provide a better brassiere fit on the user's breasts; said brassiere cues volume coincides with the volume of said user's breasts that is obtained by 3D scanning; said cups being detachable from a pair of shoulder straps at a top edge of each said breast cup and said breast cup sides each detachable from a back band support piece that is of a single size for each brassiere whereby each breast cup is sized specifically for the user's breasts and said breast cup volume is obtained by 3D scanning of said user's breasts by known 3D scanning equipment wherein said rod fitting element is also determined by said 3D scanning of said user's inframammary fold so that brassiere fitting element is sized and shaped to fit said user's inframammary fold and to expand said cup to fit along said user's inframammary fold and the cup about the volume of said user's breasts providing a customized fit of said brassiere on said user.

2. A customized brassiere for maintaining the health of a user's breasts as claimed in claim 1, further comprising: said sleeve is constructed from a hemline formed along an entire length of said lower edge of said cup and having at least one lateral opening for inserting or removing said curved rod element and wherein it comprises an elastic sheath in said hemline in order to ensure a firm support of the curved rod fitting element in said cup.

3. A customized brassiere for maintaining the health of a user's breasts as claimed in claim 1, further comprising: wherein each cup has a lateral axillary portion which is adapted to rest against the ribs of the user below the axillary hollow of said user when worn, wherein said lateral axillary portion is configured to minimize constriction and maintain lymphatic flow, thereby contributing to the health of the user's breasts.

4. A customized brassiere for maintaining the health of a user's breasts as claimed in claim 1, further comprising: wherein said back band support strap comprises two lateral securing bands, each connected to the lower edge of each said cup in the vicinity of the lateral axillary end of each said cup and a detachable back bank strap adapted to be fixed in a detachable manner to each of the two lateral securing bands at each of their respective free ends, wherein modularity of the brassiere allows for independent adjustment and replacement of said cups and back band support strap, thereby enabling the accommodation of a wider range of sizes with reduced inventory requirements.

5. A customized brassiere for maintaining the health of a user's breasts as claimed in claim 4, further comprising: wherein said detachable back band is formed of an elastic material to provide support and customized fit on the user when worn, wherein said brassiere facilities optimal breast weight distribution, enhances lymphatic drainage, and improves overall comfort for the user.

6. A customized brassiere for maintaining the health of a user's breasts as claimed in claim 1, further comprising: wherein said breast cups and said fitting element are formed from measurements of each said user's breasts obtained by conventional 3D scanning and/or photography methods that statistically combine the measurements to provide the customized volume of each of said user's breasts to thereby provide the best customized fit and size of the breast cup of the brassiere on the user; and wherein the measurement obtained from the 3D scanning and photography of the user's breasts provide the accurate inframammary fold measurements to then create the curved rod bra cup fitting element; and wherein the back band is of a uniform size amongst all brassiere sizes and said brassiere size is defined by breast volume size and not conventionally known brassiere sizes.

7. A method of constructing a customized brassiere comprising: forming two cups, each cup for receiving a breast of the user and formed of an elastic material; constructing the brassiere with detachable cups, shoulder straps, and a back support strap adding to each cup a custom cup fitting element in the cup at a lower edge within a lower edge sleeve to hold the cup fitting element therein and to allow the fitting element to keep the specific cup shape that is formed to fit the user's breasts; forming each of said cup fitting elements to comprise a curved rod that is customized to fit the form of the user's breast by being formed to coincide with measurements of the shape of the user's inframammary fold; the curved rod is formed to be adapted to a contour along said rod's entire length to the shape of the user's inframammary fold up to the ribs of said user, and extending from a vicinity of the user's sternum to the area of the user's axillary hollow; said curved rod is formed to thereby stretch the cup from the lower edge sleeve to thereby match the shape of the user's breast; the curved fitting rod element for fitting the cup to the breast of the user is formed as having a substantially flat form and being wider at its axillary end in the area of the axillary hollow and in the form of a spatula for resting flat against a user's ribs in the direction of the axillary hollow so as to improve the weight distribution of the user's breast and provide a better brassiere fit on the user's breasts; said cups being formed to be detachable from a pair of shoulder straps at a top edge of each said breast cup and said breast cup sides each being formed to be detachable from a back piece that is of a single size for each brassiere whereby each breast cup is sized specifically for the user's breasts and said breast cup volume is obtained by 3D scanning of said user's breasts by known 3D scanning equipment wherein said rod fitting element is also determined by said 3D scanning of said user's inframammary fold so that brassiere fitting element is sized and shaped to fit said user's inframammary fold and to expand said cup to fit along said user's inframammary fold and to fit the cup about the volume of said user's breasts providing a customized fit of said brassiere on said user.

\* \* \* \* \*